United States Patent
Sakano

(10) Patent No.: US 9,143,712 B2
(45) Date of Patent: Sep. 22, 2015

(54) SOLID STATE IMAGING DEVICE, DRIVING METHOD OF SOLID STATE IMAGING DEVICE, AND ELECTRONIC DEVICE HAVING A DRIVING UNIT SO THAT A POTENTIAL OF A DRAIN OF A CHARGE RESET UNIT IS CONTROLLED

(71) Applicant: Sony Corporation, Tokyo (JP)

(72) Inventor: Yorito Sakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 13/969,097

(22) Filed: Aug. 16, 2013

(65) Prior Publication Data

US 2014/0077059 A1  Mar. 20, 2014

(30) Foreign Application Priority Data

Sep. 19, 2012  (JP) ................. 2012-205619

(51) Int. Cl.
| | |
|---|---|
| H01L 27/00 | (2006.01) |
| H04N 5/378 | (2011.01) |
| H04N 5/355 | (2011.01) |
| H04N 5/3745 | (2011.01) |

(52) U.S. Cl.
CPC ........... *H04N 5/378* (2013.01); *H04N 5/35518* (2013.01); *H04N 5/3745* (2013.01)

(58) Field of Classification Search
CPC ... H04N 5/3592; H04N 5/2351; H04N 5/353; H04N 5/3532; H04N 5/378; H01L 27/14609
USPC .............. 250/208.1, 214 R; 348/294–311; 257/290–292, 440
See application file for complete search history.

(56) References Cited

U.S. PATENT DOCUMENTS 7,868,938 B2 *  1/2011  Kurane .................. 348/296

FOREIGN PATENT DOCUMENTS

| JP | 2003-018471 | 1/2003 |
| JP | 3827145 | 7/2006 |
| JP | 2006-303768 | 11/2006 |

* cited by examiner

*Primary Examiner* — Que T Le
(74) *Attorney, Agent, or Firm* — Fishman Stewart Yamaguchi PLLC

(57) ABSTRACT

There is provided a solid state imaging device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level, and then the photoelectric conversion unit is subject to light exposure.

8 Claims, 12 Drawing Sheets

FIG. 6
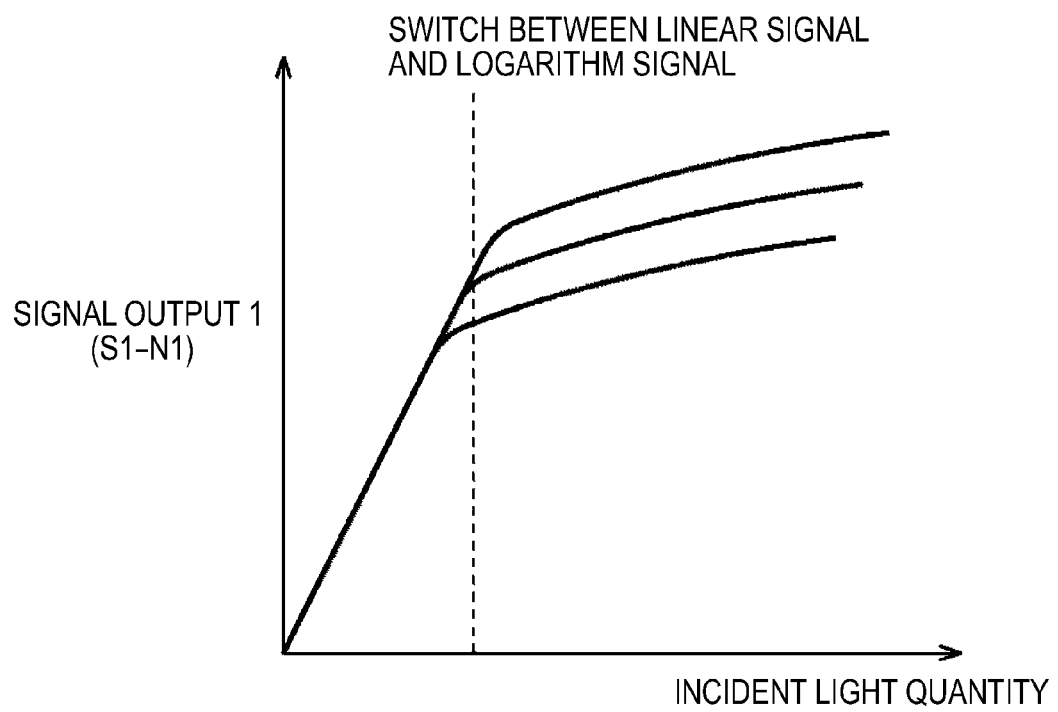
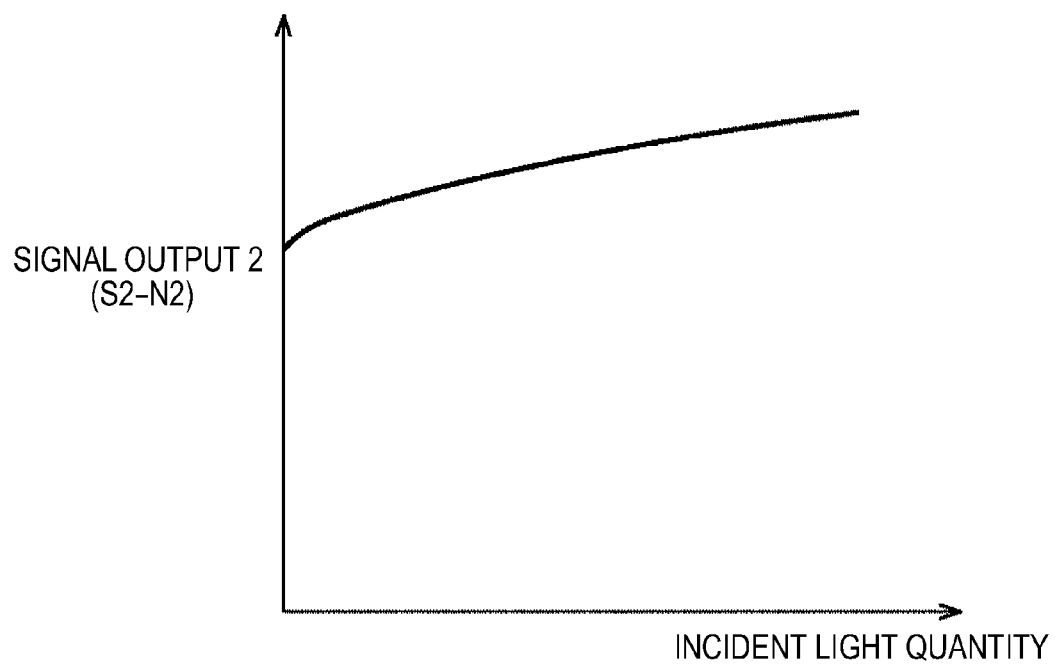

FIG. 10
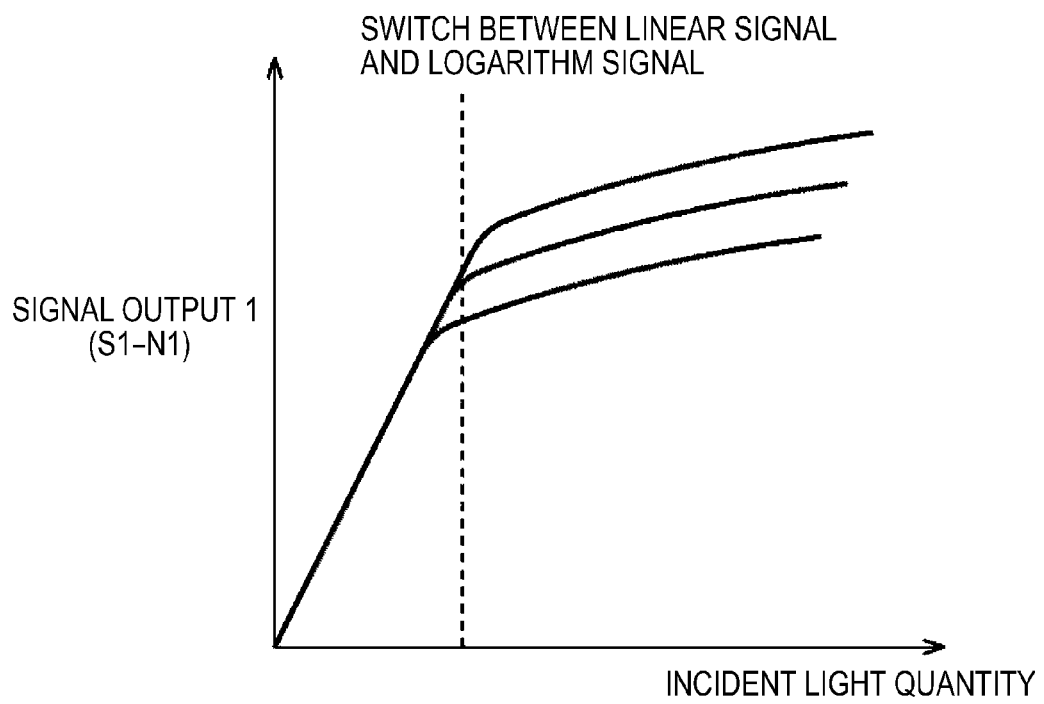
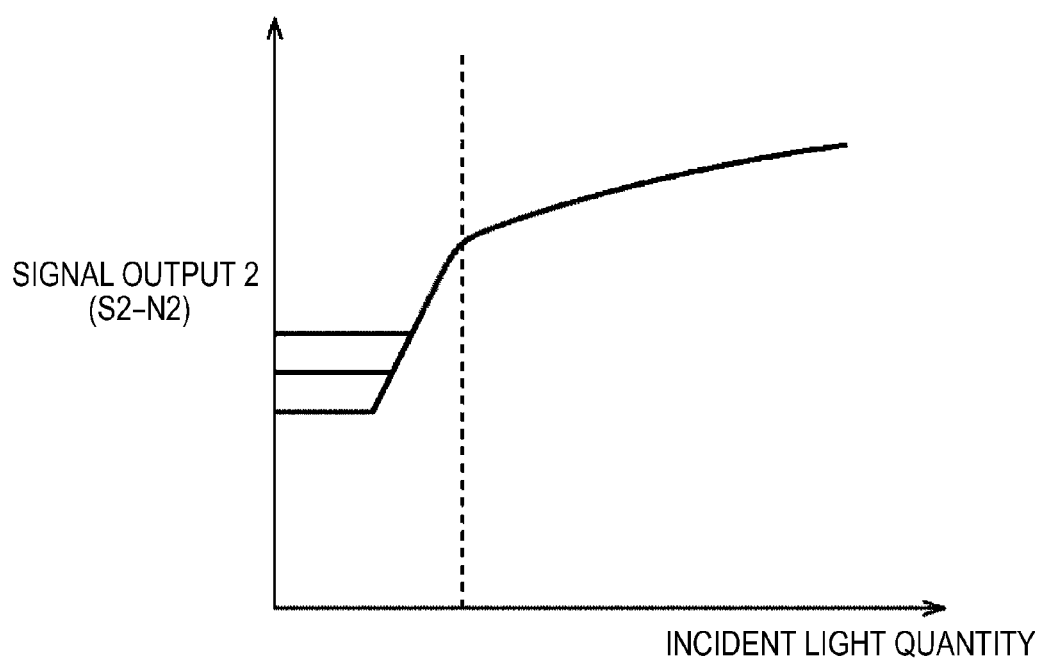

SOLID STATE IMAGING DEVICE, DRIVING METHOD OF SOLID STATE IMAGING DEVICE, AND ELECTRONIC DEVICE HAVING A DRIVING UNIT SO THAT A POTENTIAL OF A DRAIN OF A CHARGE RESET UNIT IS CONTROLLED

BACKGROUND

The present technology relates to a solid state imaging device, a driving method of a solid state imaging device, and an electronic device, and more particularly to a solid state imaging device, a driving method of a solid state imaging device, and an electronic device, which are capable of suppressing a variation in a signal of high illuminance exceeding a saturation level of a solid state imaging device.

In general metal oxide semiconductor (MOS)-type image sensors in which charges generated and accumulated in a photoelectric conversion unit (photo diode (PD)) according to an incident light quantity are read through a MOS transistor, a saturation level thereof is restricted according to a charge amount chargeable in the photoelectric conversion unit. In other words, it is difficult to properly detect a light quantity of a range exceeding the saturation level of the photoelectric conversion unit.

Therefore, for example, when the diaphragm or the shutter speed is adjusted to a dark portion of a subject, it is difficult to obtain an image for a bright portion of the subject due to saturation of the photoelectric conversion unit. On the other hand, when the diaphragm or the shutter speed is adjusted to the bright portion of the subject, since charges are not sufficiently accumulated, it is difficult to obtain an image for the dark portion of the subject, or an image quality degrades since a signal to noise (S/N) ratio is not sufficiently obtained.

In order to solve the above problem, a technique of increasing a dynamic range by capturing an image in a short period of time so that an amount of charges accumulated in the photoelectric conversion unit is not saturated while changing the shutter speed, that is, an exposure time, in the photoelectric conversion unit, capturing an image in a sufficiently long period of time so that charges can be accumulated even at darkness at which an amount of charges is not accumulated during a short period of time, and then combining the images is known.

However, in this technique, since a frame memory is necessary, the size of a device increases, and the cost increases. Further, since two signals that differ in exposure period of time are combined, it is difficult to apply the technique to a moving subject.

A technique in which neighboring rows in a pixel region are different in the exposure period of time and thus a memory is unnecessary is also known. However, in this technique, since a single signal is generated using two pixels, the resolution deteriorates.

In this regard, a technique in which both a channel voltage of a charge transfer unit connected to a photoelectric conversion unit and a charge-voltage conversion unit (floating diffusion (FD)) and a channel voltage of a charge reset unit whose one end is connected to the charge-voltage conversion unit and whose other end is connected to a predetermined voltage have a polarity different from a polarity causing a conduction state has been proposed (see JP 3827145 B (JP 2003-18471 A).

In this technique, charges are caused to overflow from the photoelectric conversion unit to the charge-voltage conversion unit and then from the charge-voltage conversion unit to a predetermined power source, a voltage of the charge-voltage conversion unit at that time is used as a first light detection voltage, and a voltage of the charge-voltage conversion unit after charges of the charge-voltage conversion unit are reset by the charge reset unit and charges accumulated in the photoelectric conversion unit are transferred by the charge transfer unit is used as a second light detection voltage.

Here, the first light detection voltage is a signal corresponding to the logarithm of illuminance, and the second light detection voltage is a low-noise signal accumulated in the photoelectric conversion unit. Thus, the two signals can be used as necessary such that the low-noise signal accumulated in the photoelectric conversion unit is used in the case of low illuminance, and a signal having a large dynamic range corresponding to the logarithm of illuminance is used in the case of high illuminance.

Further, a technique in which an intermediate potential is applied to the charge transfer unit so that charges overflow from the photoelectric conversion unit to the charge-voltage conversion unit, a highly sensitive linear signal is used in the case of low illuminance, and a signal of a large dynamic range corresponding to the logarithm of illuminance is obtained when there is much highly illuminant incident light has been proposed (see JP 2006-303768 A). In the following, a signal corresponding to the logarithm of illuminance is referred to as logarithmic compression of a signal corresponding to illuminance.

SUMMARY

However, since there is a variation in the amount of charges that can be accumulated in the photoelectric conversion unit, in the techniques disclosed in both JP 3827145 B and JP 2006-303768 A, this influence is likely to be consequential. In other words, in both cases, since the photoelectric conversion unit becomes saturated and charges that are too much to be accumulated start to overflow, the logarithmic compression of a signal starts, but when the saturation level of the photoelectric conversion unit differs according to a pixel, a light quantity at which the logarithmic compression starts differs according to a pixel. Generally, since the saturation level of the photoelectric conversion unit greatly varies, it is difficult to put any of the above-mentioned techniques to practical use in principle.

It is desirable to suppress a variation in the saturation level of the photoelectric conversion unit or the charge-voltage conversion unit when an amount of charges accumulated in the photoelectric conversion unit or the charge-voltage conversion unit exceeds the saturation level, particularly, in the case of high illuminance.

According to a first embodiment of the present technology, there is provided a solid state imaging device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level, and then the photoelectric conversion unit is subject to light exposure.

The driving unit may perform driving, such that a potential of a drain of the charge reset unit is controlled so that charges are accumulated in the photoelectric conversion unit and the charge-voltage conversion unit up to a saturation level, an intermediate potential is applied to the charge reset unit to accumulate predetermined charges in the charge-voltage conversion unit, the charge reset unit enters a non-conduction state, the charges accumulated in the photoelectric conversion unit are transferred to the charge-voltage conversion unit, and then the photoelectric conversion unit is subjected to light exposure.

Each of the charge transfer unit and the charge reset unit may form an overflow path.

The overflow path may be formed by the charge transfer unit and the charge reset unit being depression type transistors.

Both or either of the overflow paths formed by the charge transfer unit and the charge reset unit may be formed in a silicon substrate.

The solid state imaging device may further include a discharging unit that is connected to the photoelectric conversion unit and discharges charges accumulated in the photoelectric conversion unit.

According to a first embodiment of the present technology, there is provided a driving method of a solid state imaging device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level and then the photoelectric conversion unit is subject to light exposure, the driving method including performing, by the driving unit, driving such that a potential of a drain of the charge reset unit is controlled so that the charges are accumulated in the photoelectric conversion unit and the charge-voltage conversion unit up to a saturation level, and then the photoelectric conversion unit is subject to light exposure.

According to a second embodiment of the present technology, there is provided an electronic device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level, and then the photoelectric conversion unit is subject to light exposure.

According to first and second embodiments of the present technology, the photoelectric conversion unit performs photoelectric conversion of converting incident light into charges and accumulates the charges, the charge-voltage conversion unit converts the charges which have been subjected to the photoelectric conversion by the photoelectric conversion unit into a voltage, the charge transfer unit transfers charges to the charge-voltage conversion unit, the charge reset unit resets charges of the charge-voltage conversion unit, and the driving unit performs driving such that a potential of a drain of the charge reset unit is controlled so that charges are accumulated in the photoelectric conversion unit and the charge-voltage conversion unit up to a saturation level, and then the photoelectric conversion unit is subject to light exposure.

A solid state imaging device and an electronic device according to the present technology may be independent devices or instruments or blocks performing an imaging process.

According to first and second embodiments of the present technology described above, it is possible to suppress a variation in a signal of a pixel unit in the case of high illuminance exceeding a saturation level of a solid state imaging device, and set an appropriate dynamic range and perform imaging.

BRIEF DESCRIPTION OF THE DRAWINGS

FIG. 6 is a diagram illustrating characteristics of a low illuminance signal output and a high illuminance signal output with respect to an input light quantity in the timing chart of the pixel signal reading process of FIG. 3.

FIG. 10 is a diagram illustrating characteristics of a low illuminance signal output and a high illuminance signal output with respect to an input light quantity in the timing chart of the pixel signal reading process of FIG. 7.

DETAILED DESCRIPTION OF THE EMBODIMENT(S)

Figure 1:
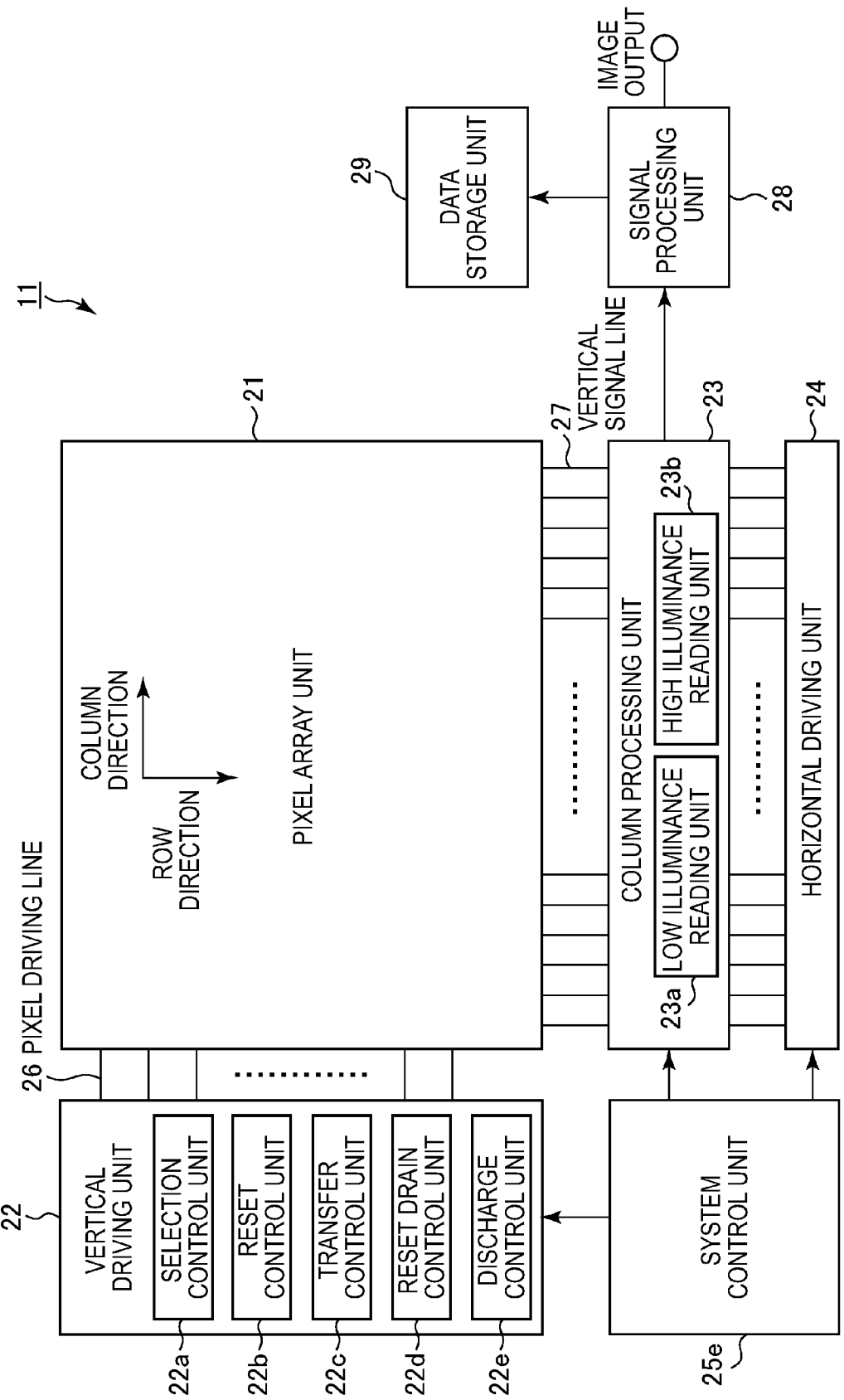
FIG. 1 is a block diagram illustrating an exemplary configuration of a solid state imaging device according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as "embodiments") for carrying out the present technology will be described with reference to the accompanying drawings. The description will proceed in the following order.

1. First embodiment (example of solid state imaging device in which exposure period of time is divided into high-illuminance period of time and low-illuminance period of time)

2. Second embodiment (example of solid state imaging device in which exposure at time of high illuminance and exposure at time of low illuminance are performed during same period of time)

3. Third embodiment (example of solid state imaging device when discharging unit is used)

1. First Embodiment

Exemplary Configuration of Solid State Imaging Device

First of all, an exemplary configuration of a solid state imaging device according to the present technology will be described. FIG. 1 is a diagram illustrating an exemplary configuration of a solid state imaging device according to an embodiment of the present technology.

A solid state imaging device 11 includes, for example, a MOS-type image sensor, and images an image by performing photoelectric conversion on incident light and generating an image signal. At this time, the solid state imaging device 11 generates two images, that is, a high-illuminance image and a low-illuminance image based on a read pixel signal, and generates an optimal image using the two generated images.

The solid state imaging device 11 includes a pixel array unit 21, a vertical driving unit 22, a column processing unit 23, a horizontal driving unit 24, a system control unit 25, a pixel driving line 26, a vertical signal line 27, a signal processing unit 28, and a data storage unit 29.

In the solid state imaging device 11, the pixel array unit 21 is formed on a semiconductor substrate (chip) (not shown), and the vertical driving unit 22 and the system control unit 25 are integrated on the semiconductor substrate.

The pixel array unit 21 includes pixels, each of which includes a photoelectric conversion unit that generates charges according to a quantity of light incident from a subject and accumulates the charges, and the pixels configuring the pixel array unit 21 are two-dimensionally arranged in the traverse direction (the row direction) and the longitudinal direction (the column direction) in the drawing.

For example, in the pixel array unit 21, the pixel driving line 26 is arranged in the row direction for each pixel row including pixels arranged in the row direction, and the vertical signal line 27 is arranged in the column direction for each pixel column including pixels arranged in the column direction.

The vertical driving unit 22 includes a shift register, an address decoder, and the like, and supplies a signal to pixels through a plurality of pixel driving lines 26 and drives the pixels of the pixel array unit 21 at the same time or in units of rows. More specifically, the vertical driving unit 22 includes a selection control unit 22a, a reset control unit 22b, a transfer control unit 22c, a reset drain control unit 22d, and a discharge control unit 22e. The selection control unit 22a controls a selection signal SEL to be applied to a pixel selecting unit. The reset control unit 22b controls a reset signal RST to be applied to a reset gate 53 of the charge reset unit. The transfer control unit 22c controls a transfer signal TRG to be applied to a transfer gate 52 of the charge transfer unit. The reset drain control unit 22d controls a potential of a reset drain of the pixel reset unit. The discharge control unit 22e controls a discharge signal ABG to be applied to a discharging unit which will be described later.

The column processing unit 23 reads signals from the respective pixels through the vertical signal line 27 for each pixel column of the pixel array unit 21, and performs a noise reduction process, a correlated double sampling (CDS) process, an analog to digital (A/D) conversion process, and the like to generate a pixel signal. More specifically, the column processing unit 23 includes a low illuminance reading unit 23a and a high illuminance reading unit 23b. The low illuminance reading unit 23a controls reading of a pixel signal for low illuminance, and the high illuminance reading unit 23b controls reading of a pixel signal for high illuminance.

The horizontal driving unit 24 includes a shift register, an address decoder, and the like, and sequentially selects unit circuits corresponding to the pixel column of the column processing unit 23. As the horizontal driving unit 24 performs selective scanning, pixel signals which have been subjected to signal processing in the unit circuits in the column processing unit 23 are sequentially output to the signal processing unit 28.

The system control unit 25 includes a timing generator that generates various kinds of driving signals and the like, and controls driving of the vertical driving unit 22, the column processing unit 23, and the horizontal driving unit 24 based on the driving signal generated by the timing generator.

The signal processing unit 28 performs signal processing such as arithmetic processing on the pixel signal supplied from the column processing unit 23 while temporarily storing data in the data storage unit 29 as necessary, and generates an image signal based on the pixel signals.

[Exemplary Configuration of Pixel]

Next, an exemplary configuration of each pixel in the pixel array unit 21 will be described with reference to FIG. 2.

Each pixel in the pixel array unit 21 includes a photoelectric conversion unit 51, the transfer gate 52, the reset gate 53, an overflow path 54, a charge-voltage conversion unit 55, and an overflow path 56. Each pixel in the pixel array unit 21 further includes a reset drain 57, a drain voltage (DRN) 58, a signal amplifying unit (AMP) 59, a pixel selecting unit 60, a vertical signal line (VSL) 61, and a constant current source 62.

The photoelectric conversion unit 51 includes a PN junction photodiode, and generates and accumulates charges according to an incident light quantity.

When the transfer signal TRG applied to the transfer gate 52 transitions to an H level, the transfer gate 52 enters the conduction state, and charges accumulated in the photoelectric conversion unit 51 are transferred to the charge-voltage conversion unit 55. Here, for example, the charge transfer unit is configured with a depression transistor or the like, and configures the overflow path 54 that transfers some charges even when the transfer gate 52 is in the non-conduction state. For this reason, when the photoelectric conversion unit 51 becomes saturated, the overflow path 54 allows charges overflowing from the photoelectric conversion unit 51 to be transferred to the charge-voltage conversion unit 55. In FIG. 2, the overflow path 54 is configured with p− near the surface layer. However, since noise can be reduced when the overflow path 54 is formed on a layer deeper than the surface layer, the overflow path 54 may be formed on a deep layer portion within a configurable range. Further, the charge transfer unit has been described as being configured with a depression transistor, but the charge transfer unit may be configured with any other component as long as the component configures the overflow path 54.

When the reset signal RST applied to the reset gate 53 transitions to the H level, the reset gate 53 enters the conduction state and resets charges accumulated in the charge-voltage conversion unit 55. Further, the reset gate 53 is configured with a depression transistor or the like, and configures the overflow path 56 that transfers some charges even when the reset gate 53 is in the non-conduction state. For this reason, when the charge-voltage conversion unit 55 becomes saturated, the overflow path 56 allows charges overflowing from the charge-voltage conversion unit 55 to be transferred to the reset drain 57. In FIG. 2, the overflow path 56 is configured with n− near the surface layer. However, since noise can be reduced when the overflow path 54 is formed on a layer deeper than the surface layer, the overflow path 56 may be formed on a deep layer portion within a configurable range. Further, the charge transfer unit has been described as being configured with a depression transistor, but the charge transfer unit may be configured with any other component as long as the component configures the overflow path 56.

The amplifying unit (AMP) 59 includes a gate electrode connected to the charge-voltage conversion unit 55 and a drain connected to a power voltage Vdd, and functions as an input part of a read circuit that reads charges obtained by photoelectric conversion in the photoelectric conversion unit 51, that is, an input part of a so-called source follower circuit. In other words, the AMP 59 includes a source connected to the vertical signal line (VSL) 61 through the selecting unit (SEL) 60, and thus configures the source follower circuit together with the constant current source 62 connected to one end of the VSL 61.

The pixel selecting unit 60 is connected to the source of the AMP 59 and the VSL 61, and the selection signal SEL is supplied to the gate electrode of the pixel selecting unit 60. When the selection signal SELL transitions to the H level, the pixel selecting unit 60 enters the conduction state, that is, the pixel selection state. In the pixel selection state, a signal output from the amplifying unit (AMP) 59 is read out to the column processing unit 23 through the vertical signal line (VSL) 61.

Further, in each pixel, for example, a plurality of driving lines are arranged for each pixel row as the pixel driving line 26 of FIG. 1. Further, driving signals TRG, DRN, RST, and SEL are supplied from the vertical driving unit 22 of FIG. 1 to the pixels through the plurality of driving lines serving as the pixel driving line 26.

Figure 2:
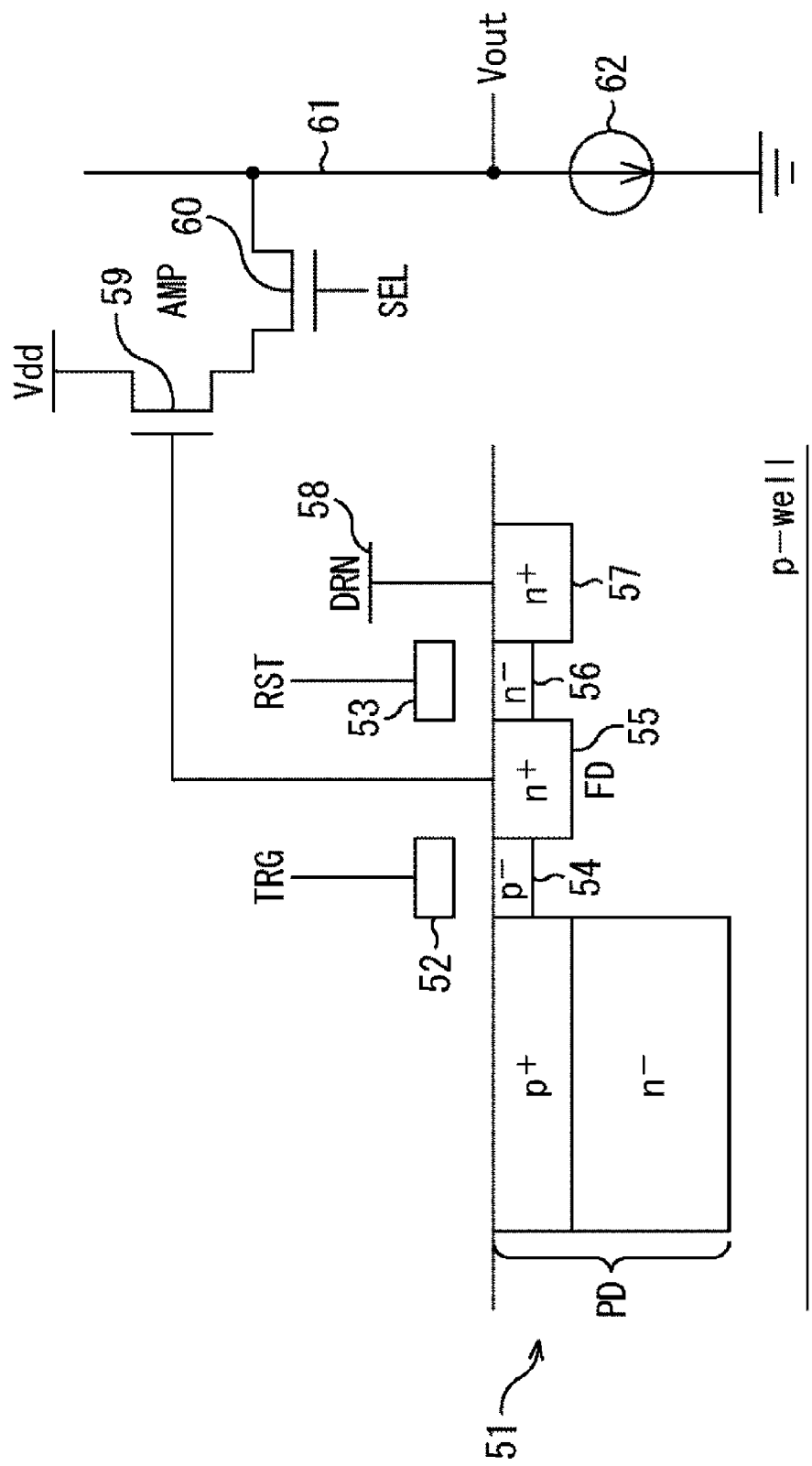
FIG. 2 is a diagram for describing an exemplary configuration of a pixel illustrated in FIG. 1.

Here, in FIG. 2, an exemplary structure in which an n-type transistor is formed on a p-well layer is illustrated, but conductive types of P and N may be inverted, and in this case, a level relation of a voltage or a potential is inverted.

[Pixel Signal Reading Process in which Exposure Period of Time is Divided into High-Illuminance Period of Time and Low-Illuminance Period of Time]

Figure 4:
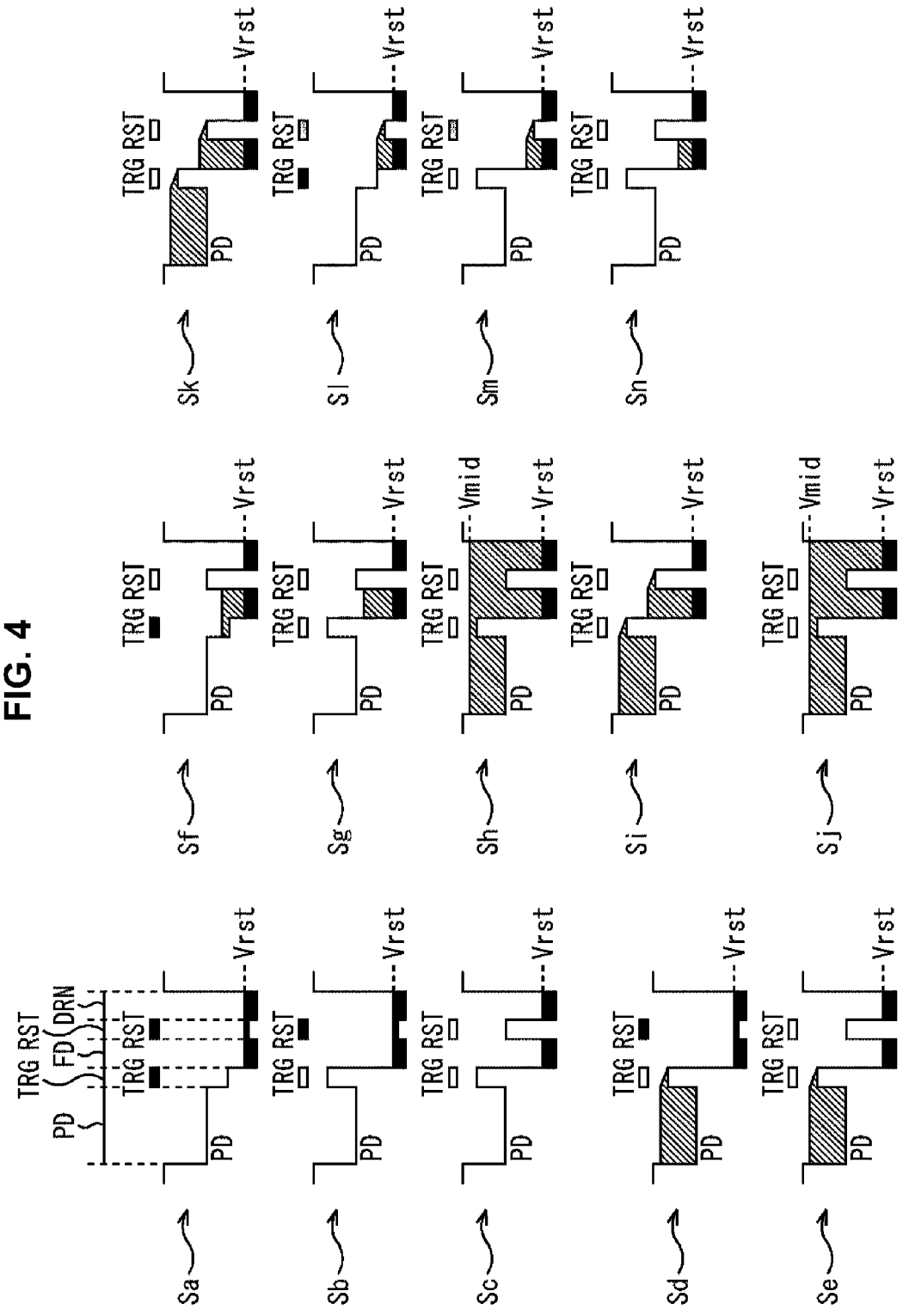
FIG. 4 is a diagram illustrating a potential at the time of high illuminance corresponding to the timing chart of the pixel signal reading process of FIG. 3.
Figure 5:
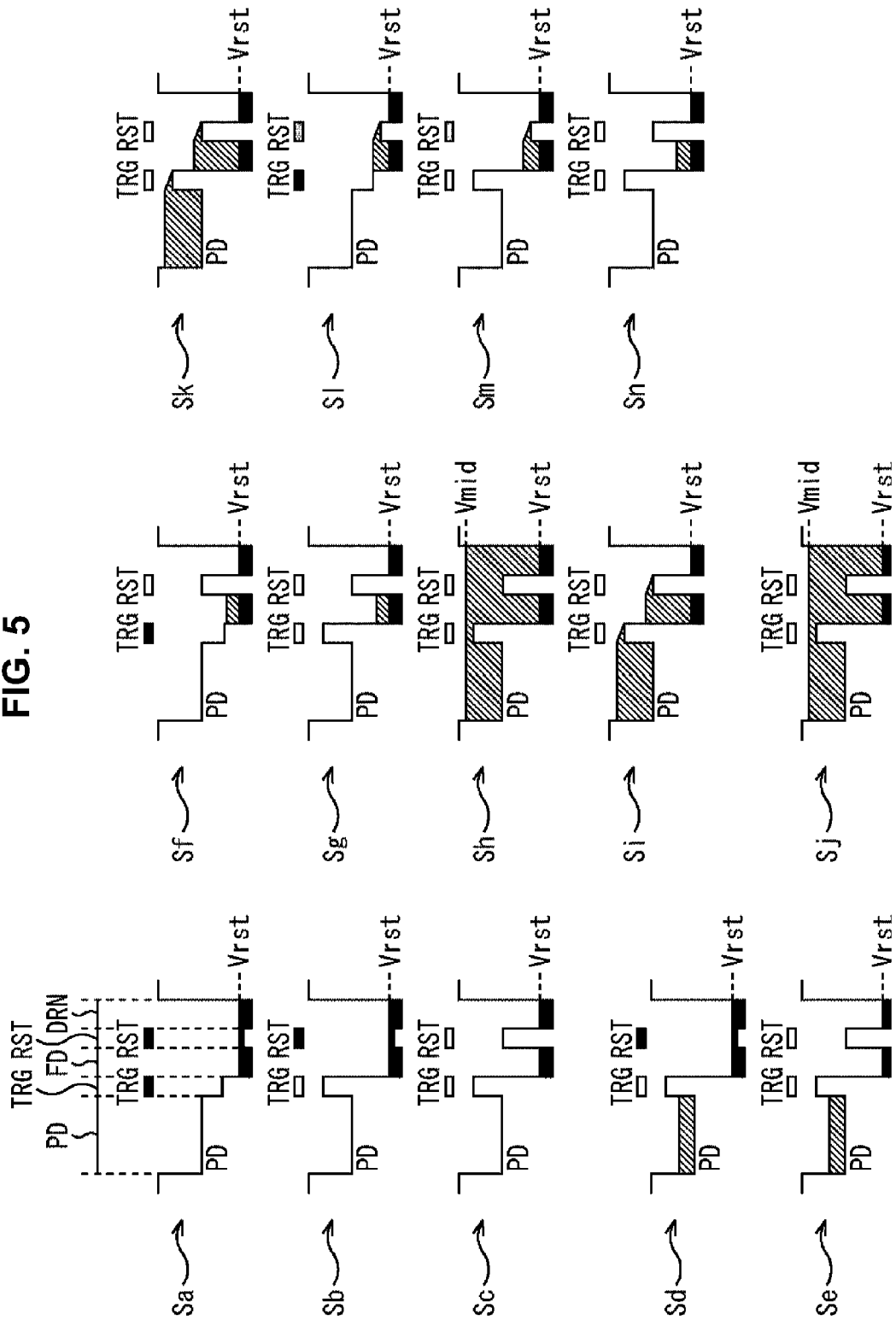
FIG. 5 is a diagram illustrating a potential at the time of low illuminance corresponding to the timing chart of the pixel signal reading process of FIG. 3.

Next, a potential state at the time of high illuminance and a potential state at the time of low illuminance in the pixel signal reading process performed on the pixel configuration illustrated in FIG. 2 will be described with reference to a timing chart of FIG. 3 and FIGS. 4 and 5. FIGS. 4 and 5 illustrate potentials of the photoelectric conversion unit 51, the transfer gate 52, the charge-voltage conversion unit 55, the reset gate 53, and the reset drain 57 in order from the left on each of states Sa to Sn as illustrated in a state Sa. Further, in the transfer gate 52 and the reset gate 53 having the square-like shape, a state in which the H level is applied as the driving signal is indicated by black, a state in which the L level is applied as the driving signal is indicated by white, and a state in which an intermediate potential is applied is indicated by gray.

Figure 3:
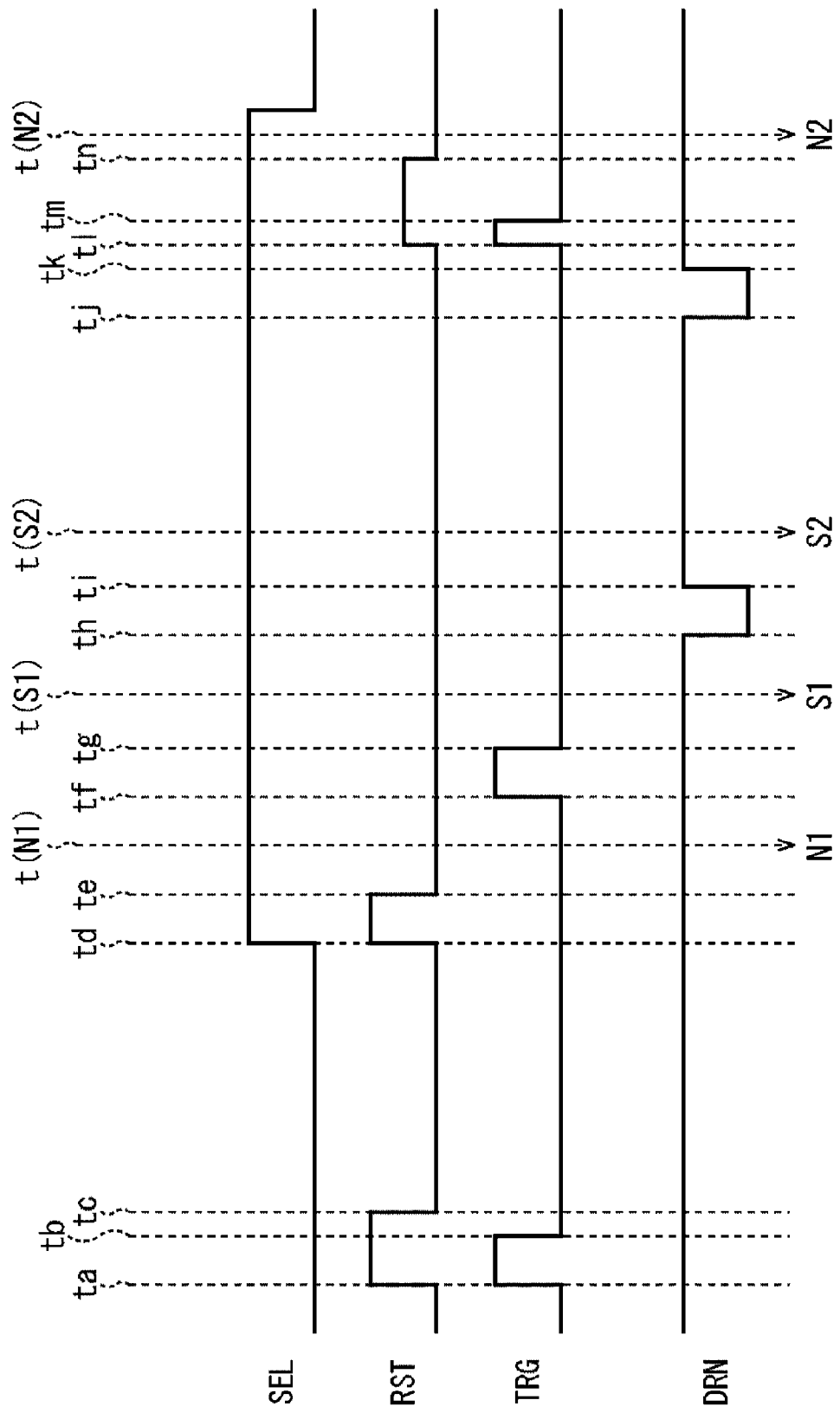
FIG. 3 is a timing chart for describing a pixel signal reading process in which an exposure period of time is divided into a high-illuminance period of time and a low-illuminance period of time in the exemplary pixel configuration illustrated in FIG. 2.

At a time ta of FIG. 3, the reset control unit 22b and the transfer control unit 22c of the vertical driving unit 22 cause the reset signal RST and the transfer signal TRG to transition to the H level, respectively, and thus the reset gate 53 and the transfer gate 52 enter the conduction state. At this time, the reset drain control unit 22d causes the reset drain voltage (DRN) 58 to have Vrst. As a result, as illustrated in the state Sa of FIGS. 4 and 5, the photoelectric conversion unit 51 reaches the depleted state, and the charge-voltage conversion unit 55 reaches the reset state.

At a time tb, the transfer control unit 22c causes the transfer signal TRG to transition to the L level. As a result, as illustrated in the state Sb of FIGS. 4 and 5, the transfer gate 52 enters the non-conduction state.

At a time tc, the reset control unit 22b causes the reset signal RST to transition to the L level. As a result, as illustrated in the state Sc of FIGS. 4 and 5, the reset gate 53 enters the non-conduction state.

Then, at times tc to td, the pixel enters the exposure state, and the photoelectric conversion unit 51 accumulates charges according to an exposure time. Here, the length between the times tc to td can be flexibly set as the exposure time.

When the exposure time elapses, at the time of high illuminance, the photoelectric conversion unit 51 reaches the saturation level as illustrated in the state Sd of FIG. 4. However, at the time of low illuminance, charges according to the exposure time are accumulated in the photoelectric conversion unit 51 as illustrated in the state Sd of FIG. 5. In FIGS. 4 and 5, hatched portions represent the state in which charges are accumulated with respect to a potential. At the time td, the selection control unit 22a and the reset control unit 22b cause the selection signal SEL and the reset signal RST to transition to the H level. As a result, the pixel selecting unit 60 enters the conduction state, that is, the pixel selection state, and the reset gate 53 enters the conduction state.

At a time te, the charge reset control unit 22b causes the reset signal RST to transition to the L level. Thus, the reset gate 53 enters the non-conduction state.

At a time t(N1), the low illuminance reading unit 23a of the column processing unit 23 reads the potential of the charge-voltage conversion unit 55 as a noise signal N1 at low illuminance.

At a time tf, when the transfer control unit 22c causes the transfer signal TRG to transition to the H level, the transfer gate 52 enters the conduction state. As a result, charges accumulated in the photoelectric conversion unit 51 are transferred to the charge-voltage conversion unit 55 as illustrated in the state Sf of FIGS. 4 and 5.

At a time tg, when the transfer control unit 22c causes the transfer signal TRG to transition to the L level, the transfer gate 52 enters the non-conduction state. As a result, the charge-voltage conversion unit 55 enters the state in which the charges generated by photoelectric conversion and accumulated in the photoelectric conversion unit 51 are stored as illustrated in the state Sg of FIGS. 4 and 5.

At a time t(S1), since the charge-voltage conversion unit 55 enters the state in which the charges generated by photoelectric conversion and accumulated in the photoelectric conversion unit 51 are stored, the low illuminance reading unit 23a of the column processing unit 23 reads the potential of the charge-voltage conversion unit 55 as a signal S1 at low illuminance.

In other words, the difference (S1−N1) between the signals S1 and N1 is a pixel signal at the time of low illuminance.

At a time th, the reset drain control unit 22d changes the potential of the drain voltage (DRN) 58 from the reset potential Vrst to a voltage Vmid at which charges are saturated in the photoelectric conversion unit 51. As a result, all of the photoelectric conversion unit 51, the charge-voltage conversion unit 55, and the reset drain 57 have the potential Vmid and enter the state in which charges are accumulated as illustrated in the state Sh of FIGS. 4 and 5.

At a time ti, the reset drain control unit 22d causes the potential of the drain voltage (DRN) 58 to return to the reset potential Vrst. At this time, the transfer gate 52 and the reset gate 53 remain in the non-conduction state. As a result, the photoelectric conversion unit 51 and the charge-voltage conversion unit 55 reach the saturation level as illustrated in the state Si of FIGS. 4 and 5. The saturation level represents the state in which an amount of charges stored in a storage capacitor of the photoelectric conversion unit 51 or the charge-voltage conversion unit 55 is saturated, that is, overflows. Then, in this state, the light exposure starts. The transfer gate 52 and the reset gate 53 have the overflow paths 54 and 56, respectively, through which charges are transferred even in the non-conduction state and thus an electric current proportional to an incident light quantity flows to the charge-voltage conversion unit 55. The voltage of the charge-voltage conversion unit 55 is known to have a value according to the logarithm of the incident light quantity.

At a time t(S2), the high illuminance reading unit 23b reads the potential of the charge-voltage conversion unit 55 as a signal S2 at high illuminance.

When the light exposure ends, at a time tj, the reset drain control unit 22d changes the drain voltage (DRN) 58 from the reset potential Vrst to the potential Vmid at which charges are saturated in the photoelectric conversion unit 51 again. As a result, similarly to the state Sh, all of the photoelectric conversion unit 51, the charge-voltage conversion unit 55, and the reset drain 57 have the potential Vmid and enter the state in which charges are accumulated as illustrated in the state Sj of FIGS. 4 and 5.

At a time tk, the reset drain control unit 22d causes the drain voltage (DRN) 58 to return to the reset voltage Vrst. At this time, the transfer gate 52 and the reset gate 53 remains in the non-conduction state. As a result, the photoelectric conversion unit 51, and the charge-voltage conversion unit 55 reach the saturation level as illustrated in the state SR of FIGS. 4 and 5.

At a time tl, the reset control unit 22b applies an intermediate potential to the reset signal RST. Further, the transfer control unit 22c causes the transfer signal TRG to transition to the H level. As a result, as illustrated in the state S1 of FIGS. 4 and 5, charges accumulated in the photoelectric conversion unit 51 and charges accumulated in the charge-voltage conversion unit 55 are mostly discharged to the reset drain 57, and charges held in the reset gate 53 by the intermediate potential remain in the charge-voltage conversion unit 55.

At a time tm, the transfer control unit 22c causes the transfer signal TRG to transition to the L level. Thus, the transfer gate 52 enters the non-conduction state.

At a time tn, the reset control unit 22b causes the reset signal RST to transition to the L level. Thus, the reset gate 53 enters the non-conduction state.

At a time t(N2), the high illuminance reading unit 23b reads the charges accumulated in the charge-voltage conversion unit 55 as a noise signal N2. The column processing unit 23 can suppress a variation in a characteristic of each pixel resulting from a variation in a threshold value Vth of the reset gate 53 in each pixel by subtracting the noise signal N2 from the pixel signal S2.

In other words, the column processing unit 23 outputs (S1−N1) as the image signal at the time of low illuminance and outputs (S2−N2) as the image signal at the time of high illuminance. Here, the image signal (S1−N1) at the time of low illuminance and the image signal (S2−N2) at the time of high illuminance represent light response characteristics illustrated in FIG. 6. In FIG. 6, an upper light response waveform represents the light response characteristic of the image signal (S1−N1) at the time of low illuminance, and a lower light response waveform represents the light response characteristic of the image signal (S2−N2) at the time of high illuminance. In the waveform diagram, a dotted line represents a boundary between a range in which linear processing can be performed on the incident light quantity and a range having a value corresponding to the logarithm non-linearly.

In other words, the image signal (S1−N1) at the time of low illuminance is a signal linearly obtained within the range up to the boundary in which the incident light quantity exceeds the saturation level. For this reason, the signal is appropriately obtained as the signal within the range up to the boundary, that is, the range of low illuminance. Here, when the image signal (S1−N1) at the time of low illuminance exceeds the boundary, since the boundary differs according to each photoelectric conversion unit 51, a plurality of waveforms are obtained. In other words, when the image signal (S1−N1) at the time of low illuminance exceeds the boundary, it is difficult to use the signal as an appropriate signal.

Meanwhile, a signal of up to extremely high illuminance can be obtained as the signal (S2−N2) for high illuminance since an electric current of the saturation level of the photoelectric conversion unit 51 or more, which is proportional to the incident light quantity, is monitored. However, for low illuminance, since charges are not temporally integrated, a signal on the incident light quantity is small, and noise is large. Further, for the noise signal N2, since charges are obtained such that the charge-voltage conversion unit 55 is first filled with charges and then an intermediate potential is applied to the reset gate 53, a variation in the threshold value Vth is corrected, but an offset compared to an actual noise signal occurs. Thus, it is necessary to correct the offset in view of this point.

The signal processing unit 28 combines the image signal at the time of high illuminance with the image signal at the time of low illuminance, and generates an image including an image signal in which an appropriate dynamic range is set to each of a high illuminance region and a low illuminance region.

As described above, it is possible to suppress a variation in a character of each pixel resulting from a variation in an overflow potential and appropriately acquire the image signal at the time of high illuminance. As a result, it is possible to appropriately extract a high illuminance image and a low illuminance image, and thus it is possible to generate an image including an image signal in which an appropriate dynamic range is set to each of a high illuminance region and a low illuminance region.

2. Second Embodiment

Pixel Signal Reading Process in which Exposure at Time of High Illuminance and Exposure at Time of Low Illuminance are Performed During Same Period of Time The above description has been made in connection with the example in which an exposure period of time is divided into a high illuminance period of time and a low illuminance period of time. However, an image signal may be read with an exposure period of time in which a high illuminance period of time and a low illuminance period of time are set to the same period of time.

In this regard, next, a potential state at the time of high illuminance and a potential state at the time of low illuminance in the pixel configuration illustrated in FIG. 2 will be described with reference to a timing chart of FIG. 7 and FIGS. 8 and 9. Here, notation in FIGS. 8 and 9 corresponds to notation in FIGS. 4 and 5. Further, for the pixel signal reading process in which the saturation level of the photoelectric conversion unit 51 is considered, the configurations of the solid state imaging device and the pixel are the same as those described in FIGS. 1 and 2, and thus a description thereof will not be made. In other words, a difference lies in driving of each component.

At a time ta, the reset drain control unit 22d changes the drain voltage (DRN) 58 from the reset potential Vrst to the voltage Vmid at which charges in the photoelectric conversion unit 51 are saturated. As a result, the photoelectric conversion unit 51, the transfer gate 52, the charge-voltage conversion unit 55, the reset gate 53, and the reset drain 57 enter the state in which charges are accumulated as illustrated in the state Sa of FIGS. 8 and 9.

At a time tb, the reset drain control unit 22d causes the drain voltage (DRN) 58 to return to the reset voltage Vrst. At this time, the transfer gate 52 and the reset gate 53 remain in the non-conduction state. As a result, the photoelectric conversion unit 51 and the charge-voltage conversion unit 55 reach the saturation level as illustrated in the state Sb of FIGS. 8 and 9.

At a time tc, the reset control unit 22b applies the intermediate potential to the reset signal RST. Thus, the reset gate 53 is turned on in the state of the intermediate potential. As a result, charges held in the reset gate 53 by the intermediate potential remain in the charge-voltage conversion unit 55 as illustrated in the state Sc of FIGS. 8 and 9.

At a time td, the reset control unit 22b causes the reset signal RST to transition to the L level. Thus, the reset gate 53 enters the non-conduction state. As a result, charges held in the reset gate 53 by the intermediate potential remain in the charge-voltage conversion unit 55 as illustrated in the state Sd of FIGS. 8 and 9.

At a time te, the transfer control unit 22c causes the transfer signal TRG to transition to the H level. Thus, the transfer gate 52 enters the conduction state.

At a time tf, the transfer control unit 22c causes the transfer signal TRG to transition to the L level. As a result, charges in which charges of the saturation level of the photoelectric conversion unit 51 are added to charges held in the reset gate 53 by the intermediate potential are accumulated in the charge-voltage conversion unit 55 as illustrated in the state Sf of FIGS. 8 and 9. In other words, charges corresponding to the saturation charge amount of the photoelectric conversion unit 51 are accumulated in the charge-voltage conversion unit 55.

Then, at times tf to tg, the pixel is in the exposure state, and charges according to the exposure time are accumulated in the photoelectric conversion unit 51. Here, the length between the times tc to td can be flexibly set as the exposure time.

Figure 8:
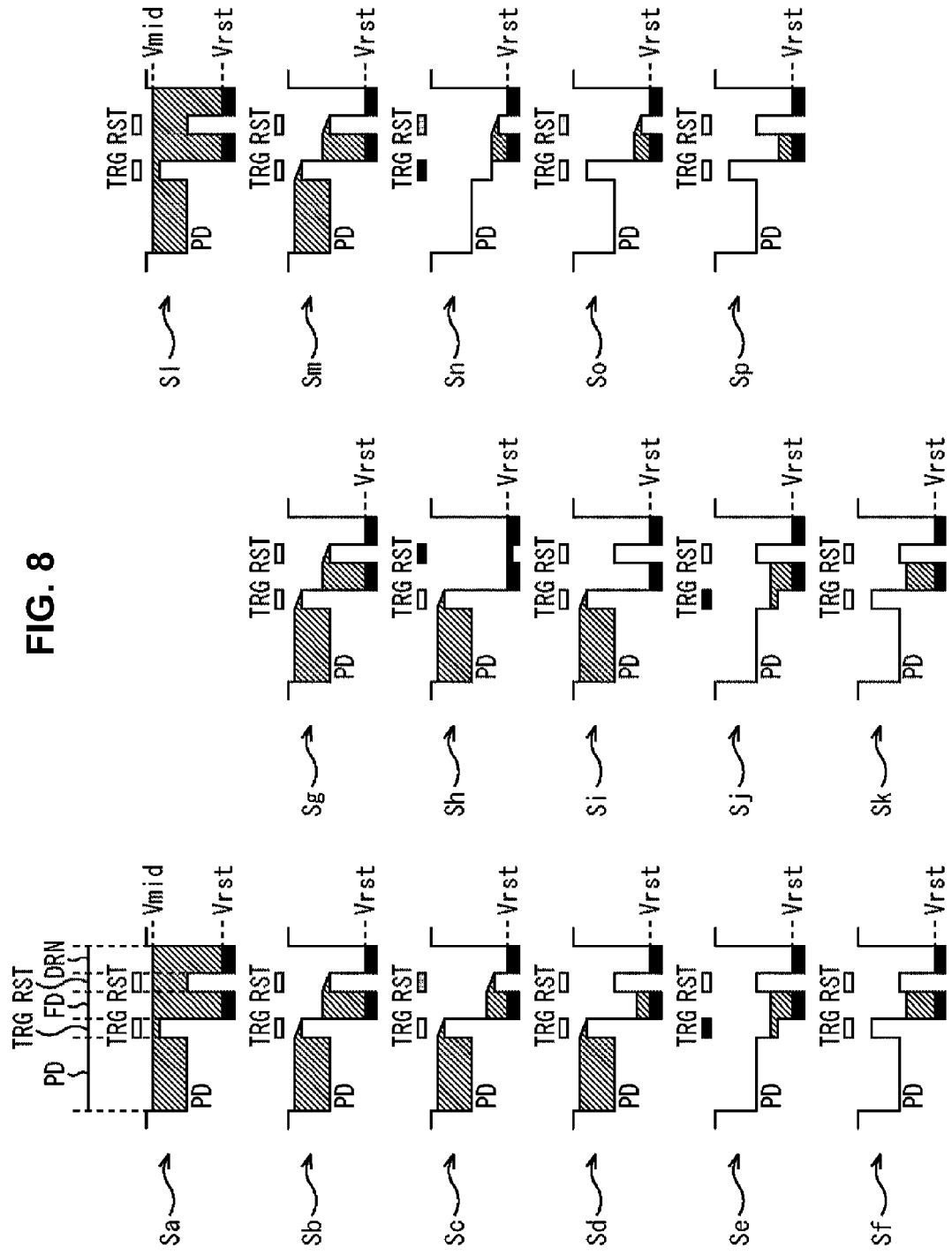
FIG. 8 is a diagram illustrating a potential at the time of high illuminance corresponding to the timing chart of the pixel signal reading process of FIG. 7.

When the exposure time elapses, at the time of high illuminance, the photoelectric conversion unit 51 and the charge-voltage conversion unit 55 reach the saturation level as illustrated in the state Sg of FIG. 8. The transfer gate 52 and the reset gate 53 have the overflow paths 54 and 56, respectively, through which charges are transferred even in the non-conduction state and thus an electric current proportional to the incident light quantity flows to the charge-voltage conversion unit 55. The voltage of the charge-voltage conversion unit 55 is known to have a value according to the logarithm of the incident light quantity. At a time tg, the selection control unit 22a and the reset control unit 22b cause the selection signal SEL and the reset signal RST to transition to the H level, respectively. As a result, the pixel selecting unit 60 enters the conduction state, that is, the pixel selection state, and the reset gate 53 enters the conduction state.

At a time t(S2), the high illuminance reading unit 23b reads the potential of the charge-voltage conversion unit 55 at this time as the signal S2 at high illuminance.

Figure 9:
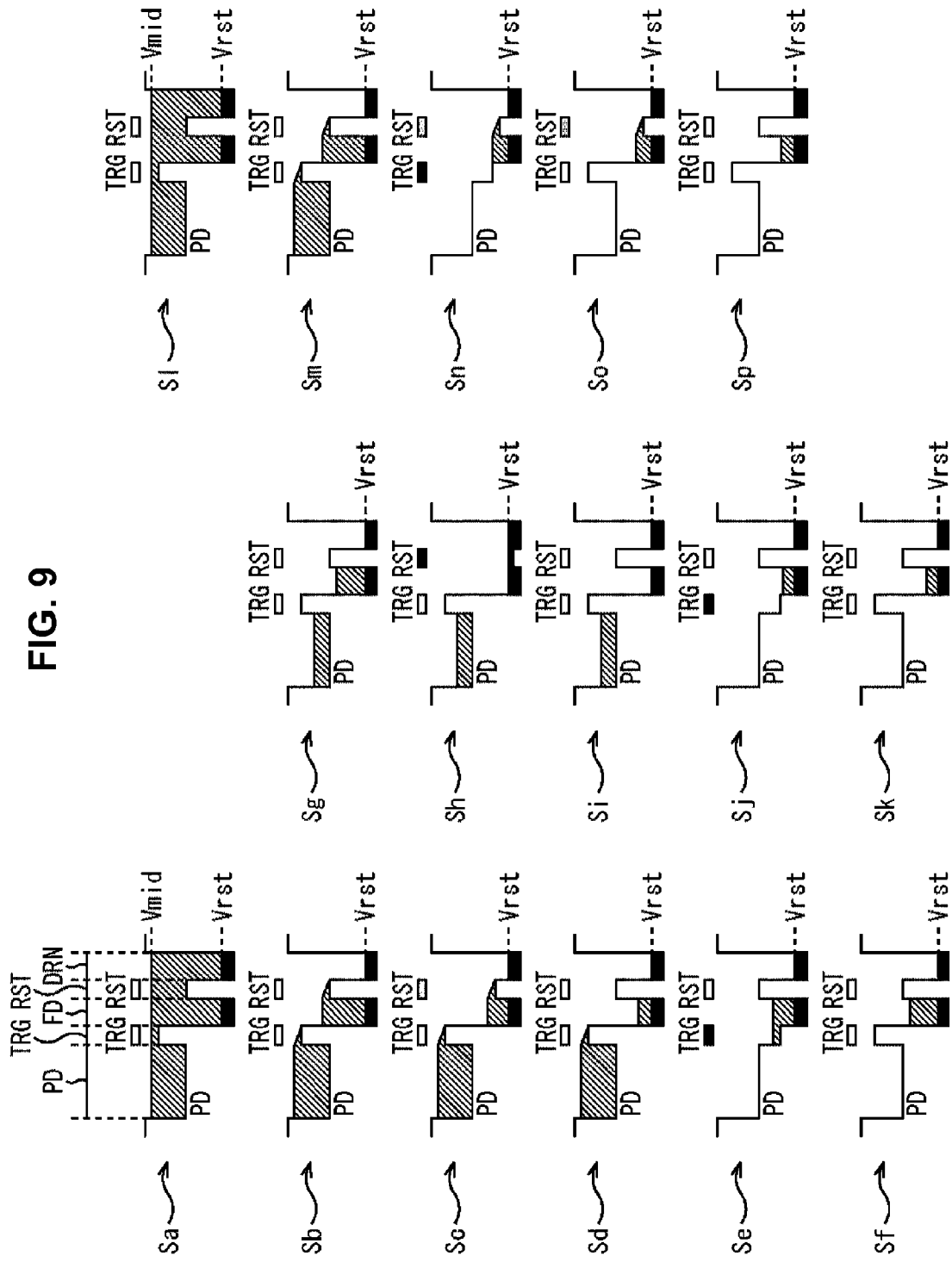
FIG. 9 is a diagram illustrating a potential at the time of low illuminance corresponding to the timing chart of the pixel signal reading process of FIG. 7.

Meanwhile, at the time of low illuminance, at the time tg, as illustrated in the state Sg of FIG. 9, charges according to the exposure time are accumulated in the photoelectric conversion unit 51, but at the time of low illuminance, charges accumulated in the photoelectric conversion unit 51 are not saturated. In this regard, at the time t(S2), the high illuminance reading unit 23b reads the potential of the charge-voltage conversion unit 55 at this time as the signal S2 at high illuminance. In other words, in the case of low illuminance, in the state Sf, charges accumulated in the charge-voltage conversion unit 55 are read as the signal S2 without change.

At a time th, when the reset control unit 22b causes the reset signal RST to transition to the H level, the reset gate 53 enters the conduction state. As a result, as illustrated in the state Sh in FIGS. 8 and 9, charges accumulated in the charge-voltage conversion unit 55 are discharged to the reset drain 57 through the reset gate 53.

At a time ti, when the reset control unit 22b causes the reset signal RST to transition to the L level, the reset gate 53 enters the non-conduction state.

At a time t(N1), the low illuminance reading unit 23a reads the potential of the charge-voltage conversion unit 55 as the noise signal N1 at low illuminance.

At a time tj, when the transfer control unit 22c causes the transfer signal TRG to transition to the H level, the transfer gate 52 enters the conduction state. As a result, as illustrated in the state Sj of FIGS. 8 and 9, charges accumulated in the photoelectric conversion unit 51 are transferred to the charge-voltage conversion unit 55.

At a time tk, the transfer control unit 22c stops generating the transfer signal TRG. The transfer gate 52 enters the off state, and thus the charges accumulated in the photoelectric conversion unit 51 are hardly transferred. As a result, as illustrated in the state Sk of FIGS. 8 and 9, charges read by the photoelectric conversion unit 51 are accumulated in the charge-voltage conversion unit 55.

Further, at a time t(S1), the low illuminance reading unit 23a reads the potential of the charge-voltage conversion unit 55 at this time as the signal S1 at low illuminance.

At a time tl, the reset drain control unit 22d changes the drain voltage (DRN) 58 from the reset potential Vrst to the voltage Vmid at which charges in the photoelectric conversion unit 51 are saturated again. As a result, as illustrated in the state S1 of FIGS. 8 and 9, similarly to the state Sa, all of the photoelectric conversion unit 51, the charge-voltage conversion unit 55, and the reset drain 57 have the voltage Vmid and enter the state in which charges are accumulated.

Further, at a time tm, the reset drain control unit 22d causes the reset drain voltage (DRN) 58 to return to the reset voltage Vrst. At this time, the transfer gate 52 and the reset gate 53 remain in the non-conduction state. As a result, as illustrated in the state Sm of FIGS. 8 and 9, the photoelectric conversion unit 51 and the charge-voltage conversion unit 55 reach the saturation level.

At a time tn, the reset control unit 22b applies the intermediate potential to the reset signal RST. Further, the transfer control unit 22c causes the transfer signal TRG to transition to the H level. As a result, as illustrated in the state Sn of FIGS. 8 and 9, charges held in the reset gate 53 by the intermediate potential remain in the charge-voltage conversion unit 55

At a time to, the transfer control unit 22c causes the transfer signal TRG to transition to the L level. Thus, the transfer gate 52 enters the non-conduction state.

At a time tp, the reset control unit 22b causes the reset signal RST to transition to the L level. Thus, the reset gate 53 enters the non-conduction state.

At a time t(N2), the low illuminance reading unit 23a reads the potential of the charge-voltage conversion unit 55 as the noise signal N2. Accordingly, it is possible to suppress influence resulting from a variation in the threshold value Vth of the reset gate 53 on each pixel by subtracting the noise signal N2 from the pixel signal S2.

In other words, the column processing unit 23 outputs (S1–N1) as the image signal at the time of low illuminance, and outputs (S2–N2) as the image signal at the time of high illuminance. Here, the image signal (S1–N1) at the time of low illuminance and the image signal (S2–N2) at the time of high illuminance have response characteristics illustrated in FIG. 10. In FIG. 10, an upper response waveform represents the response characteristic of the image signal (S1–N1) at the time of low illuminance with respect to the incident light quantity, and a lower light response waveform represents the response characteristic of the image signal (S2–N2) at the time of high illuminance with respect to the incident light quantity. In the waveform diagrams, a dotted line represents a boundary between a range in which linear processing can be performed on the incident light quantity and a range having a value corresponding to the logarithm non-linearly. The upper response waveform of FIG. 10 is the same as the upper response waveform of FIG. 6.

In other words, as illustrated in FIG. 10, the image signal (S1–N1) at the time of low illuminance is a signal linearly obtained within the range of up to the boundary of the incident light quantity, similarly to the upper waveform diagram of FIG. 6. For this reason, the signal is appropriately obtained as the signal within the range of up to the boundary, that is, the range of low illuminance.

Meanwhile, there occurs a variation in the signal (S2–N2) for high illuminance since charges accumulated in the charge-voltage conversion unit 55 in advance differs according to the saturation level of the photoelectric conversion unit 51 due to the process of the times ta to tf. Here, the charges accumulated in the charge-voltage conversion unit 55 in advance are charges accumulated according to the saturation level of each photoelectric conversion unit 51. Thus, since when the saturation charge amount of the photoelectric conversion unit 51 is large, the amount of charges accumulated in the charge-voltage conversion unit 55 is large, even when a small amount of charges are supplied through the overflow path 54 as the photoelectric conversion unit 51 becomes saturated, the charges are discharged from the overflow path 56 to the reset drain 57. On the other hand, since when the saturation charge amount of the photoelectric conversion unit 51 is small, the amount of charges accumulated in the charge-voltage conversion unit 55 is small, unless a large amount of charges are supplied through the overflow path 54 as the photoelectric conversion unit 51 becomes saturated, the charges are not discharged from the overflow path 56 to the reset drain 57. As a result, as charges are accumulated in the charge-voltage conversion unit 55 and advance according to the amount of charges supplied from the photoelectric conversion unit 51, which is necessary until charges are discharged to the reset drain 57 through the overflow path 56, through the overflow path 54, a change in the amount of charges after reaching the saturation level can be set to all pixels in common.

Further, in the process described above with reference to the timing chart of FIG. 3, the exposure period of time is time-divided, and in the process described above with reference to FIG. 7, the exposure is performed during the same period of time. In other words, in the process described above with reference to FIG. 7, imaging capable of setting an appropriate dynamic range can be implemented at a high speed in view of a variation in the threshold value Vth of the reset gate 53 at the time of high illuminance and a variation in the saturation level of the photoelectric conversion unit 51.

Through the above-described process, a high illuminance signal can be read in view of both a variation in the threshold value Vth of the reset gate 53 and a variation in the saturation level of the photoelectric conversion unit 51, and an image in which an appropriate dynamic range is set to each of a low illuminance region and a high illuminance region thereof based on a low illuminance image signal and a high illuminance image signal.

3. Third Embodiment

Exemplary Configuration of Pixel when Discharging Unit is Used

The above description has been made in connection with the pixel signal reading process in which a variation in the threshold value Vth of the reset gate 53 and a variation in the saturation level of the photoelectric conversion unit 51, which cause a problem at the time of high illuminance, are considered. For example, when the sun is directly imaged, there are cases in which the photoelectric conversion unit 51 momentarily reaches the saturation level. However, in this case, a discharging unit may be disposed to prevent charges accumulated in the photoelectric conversion unit 51 from reaching the saturation level, and thus even in imaging at the time of high illuminance, an image signal can be acquired within an appropriate dynamic range.

Figure 11:
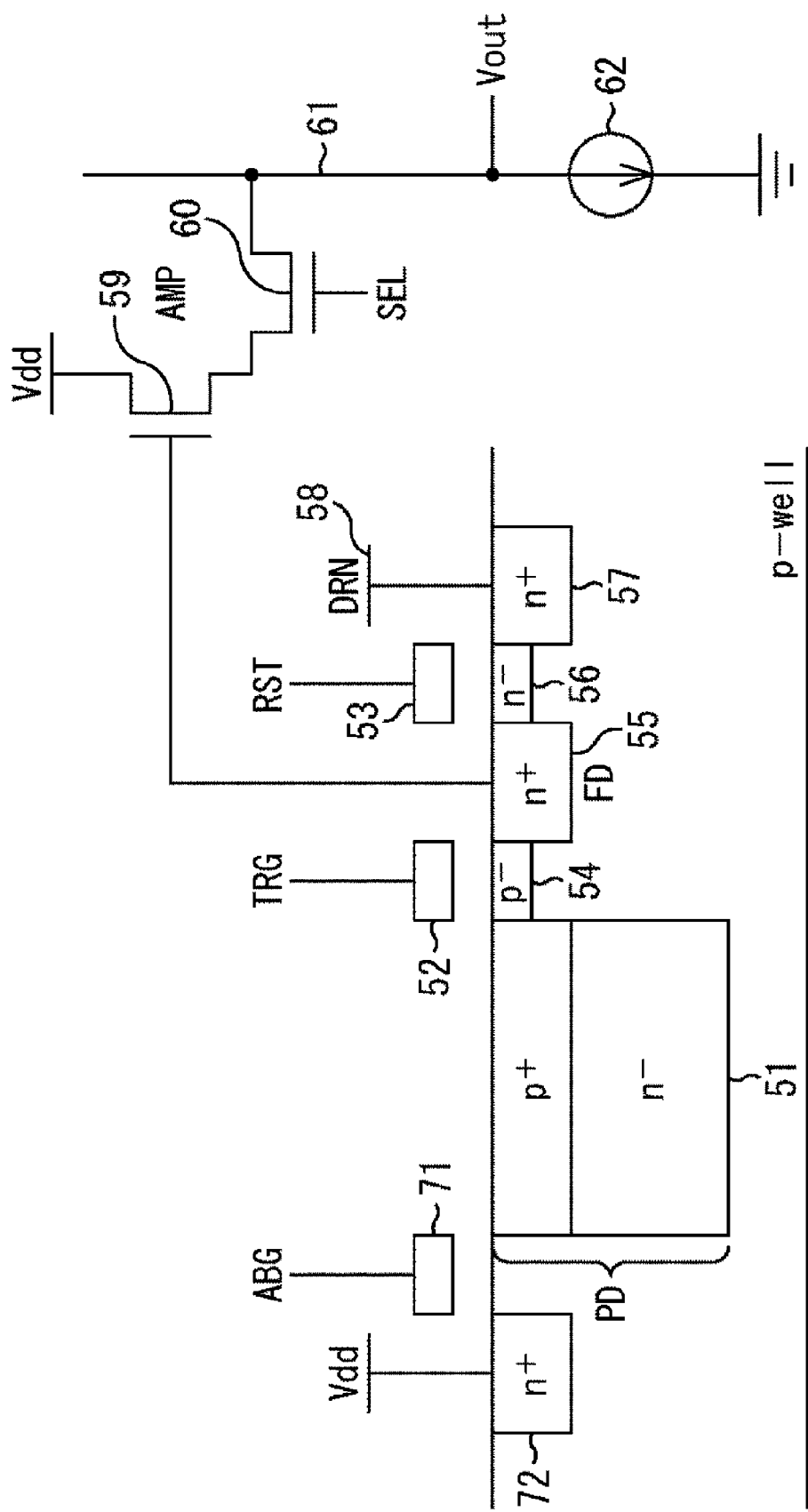
FIG. 11 is a diagram for describing another exemplary configuration of a pixel illustrated in FIG. 1.

FIG. 11 illustrates an exemplary pixel configuration including a discharging unit. Here, a component which is the same as or has the same function as in the exemplary configuration of the pixel illustrated in FIG. 2 is denoted by the same reference numeral, and thus a description thereof will be appropriately omitted. In other words, an exemplary configuration of a pixel illustrated in FIG. 11 is different from the exemplary configuration of the pixel illustrated in FIG. 2 in that a discharging unit 71 and an electrode section 72 are newly disposed. The discharging unit 71 forcibly discharges charges accumulated in the photoelectric conversion unit 51 through an electrode section 72 made of an n+ layer connected to the power voltage Vdd.

[Pixel Signal Reading Process Using Discharging Unit]

Next, a pixel signal reading process in the exemplary configuration of the pixel illustrated in FIG. 11 will be described with reference to a timing chart of FIG. 12. Here, basic driving is similar to the process described above with reference to the timing charts of FIGS. 3 and 7, and thus the description will proceed focusing on different processes.

Figure 7:
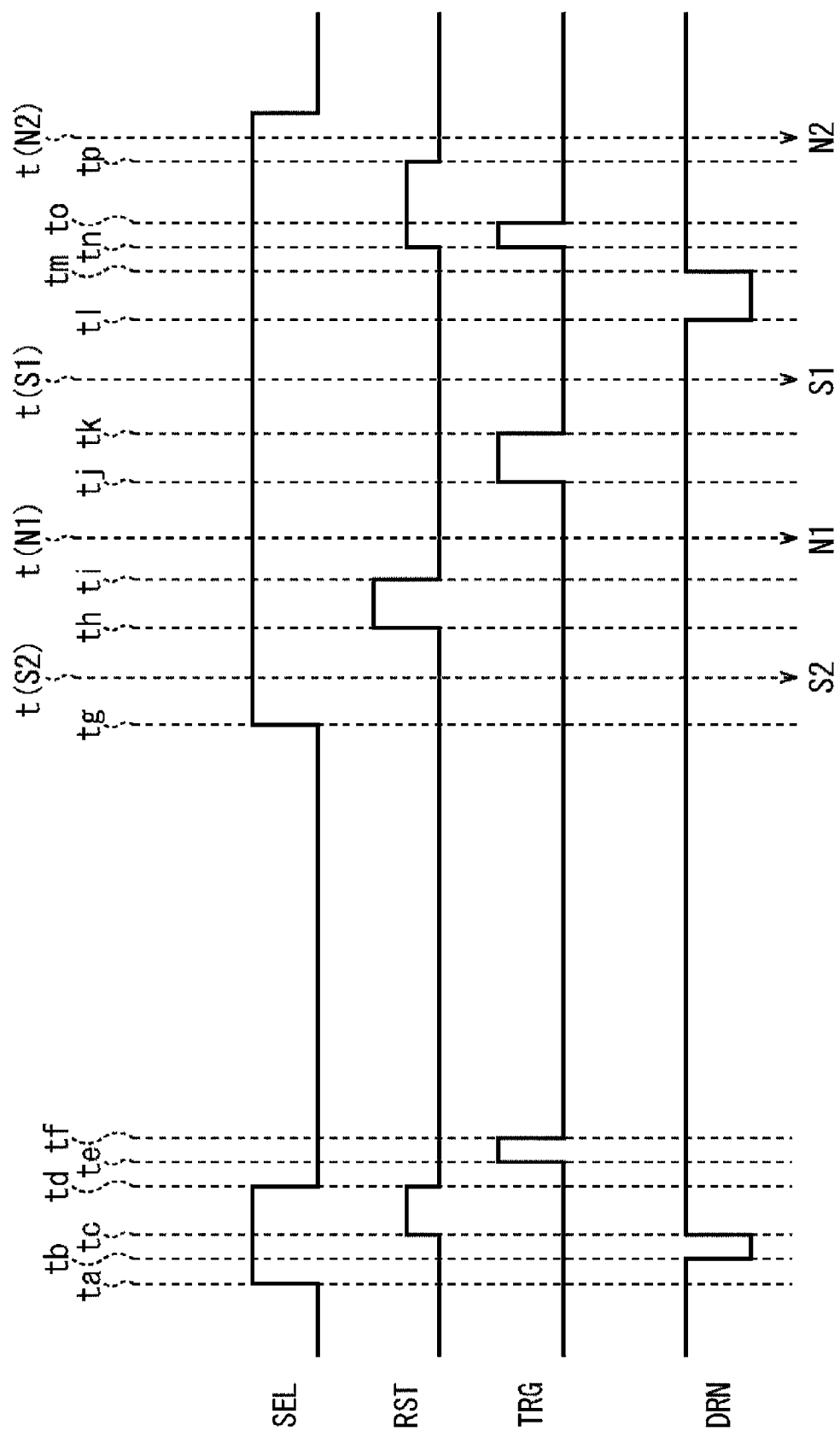
FIG. 7 is a timing chart for describing a pixel signal reading process in which exposure at time of high illuminance and exposure at time of low illuminance are performed during the same period of time in the pixel exemplary configuration of FIG. 2.
Figure 12:
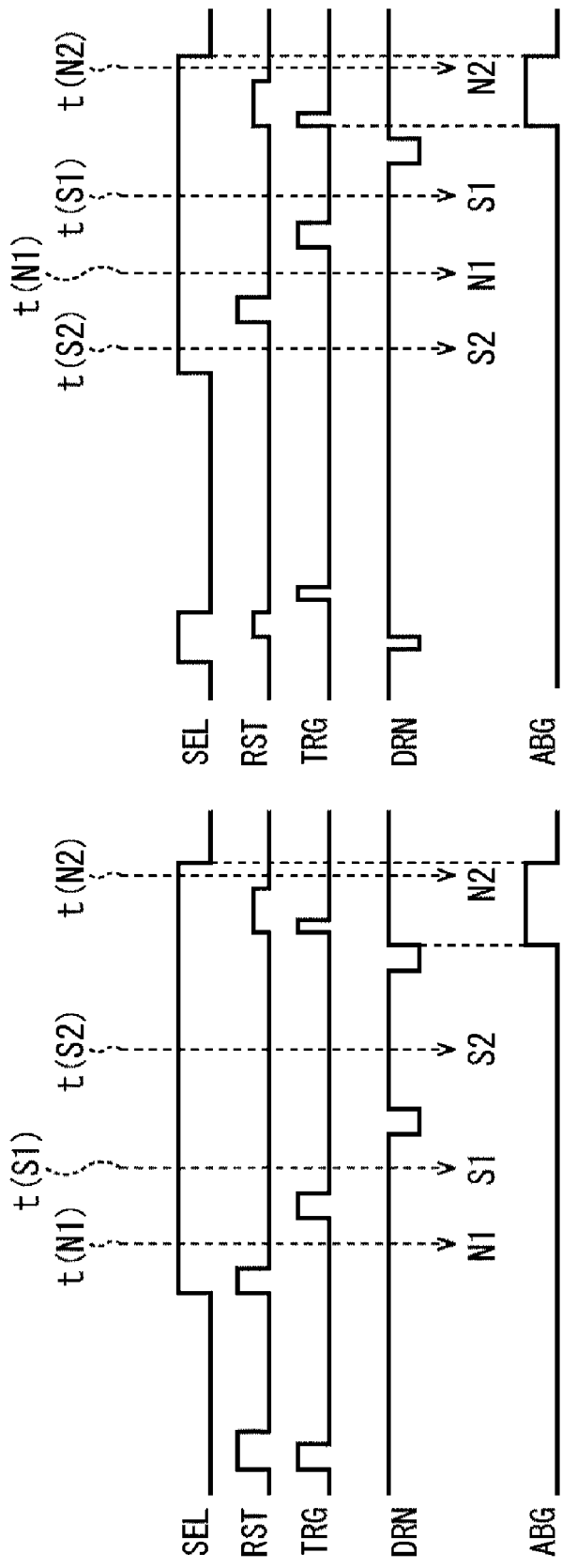
FIG. 12 is a timing chart for describing a pixel signal reading process in the exemplary pixel configuration illustrated in FIG. 11.

In other words, in FIG. 12, the discharge control unit 22e generates a discharging signal at timings corresponding to the times tk and tm in each of FIGS. 3 and 7. The discharging unit 71 sequentially discharges charges accumulated in the photoelectric conversion unit 51 based on the discharging signal. Then, at the time t(N2), the high illuminance reading unit 23b reads the voltage of the charge-voltage conversion unit 55 at this time as the noise signal N2 for a high illuminance image.

In other words, since an extreme situation in which a high illuminance image is captured using the sun as a subject is assumed here, the photoelectric conversion unit 51 is considered to generate a large amount of charges at a high speed. In this regard, the discharging unit 71 discharges charges accumulated in the photoelectric conversion unit 51 up to a level at which a dynamic range can be secured. Accordingly, an appropriate dynamic range can be secured even at high illuminance.

Thus, an image in which an appropriate dynamic range is set to each of the high illuminance region and the low illuminance region can be generated based on a high illuminance image signal and a low illuminance image signal.

Through the above-described process, a high illuminance image signal and a low illuminance image signal can be acquired in an appropriate dynamic range, and thus an image signal of an appropriate dynamic range can be acquired using the high illuminance image signal and the low illuminance image signal while suppressing influence resulting from a variation in the threshold value Vth of the reset gate 53 and a variation in the saturation level of the photoelectric conversion unit 51.

The embodiment of the present technology is not limited to the above embodiments, and various changes can be made within the scope not departing from the gist of the present technology.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A solid state imaging device, including:
a photoelectric conversion unit that performs photoelectric conversion of converting incident light into charges and accumulates the charges;
a charge-voltage conversion unit that converts the charges which have been subjected to the photoelectric conversion by the photoelectric conversion unit into a voltage;
a charge transfer unit that transfers charges to the charge-voltage conversion unit;
a charge reset unit that resets charges of the charge-voltage conversion unit; and
a driving unit that performs driving, such that a potential of a drain of the charge reset unit is controlled so that charges are accumulated in the photoelectric conversion unit and the charge-voltage conversion unit up to a saturation level, and then the photoelectric conversion unit is subject to light exposure.

(2) The solid state imaging device according to (1),
wherein the driving unit performs driving, such that a potential of a drain of the charge reset unit is controlled so that the charges are accumulated in the photoelectric conversion unit and the charge-voltage conversion unit up to a saturation level, an intermediate potential is applied to the charge reset unit to accumulate predetermined charges in the charge-voltage conversion unit, the charge reset unit enters a non-conduction state, the charges accumulated in the photoelectric conversion unit are transferred to the charge-voltage conversion unit, and then the photoelectric conversion unit is subjected to light exposure.

(3) The solid state imaging device according to (1) or (2),
wherein each of the charge transfer unit and the charge reset unit forms an overflow path.

(4) The solid state imaging device according to (3),
wherein the overflow path is formed by the charge transfer unit and the charge reset unit being depression type transistors.

(5) The solid state imaging device according to (3),
wherein both or either of the overflow paths formed by the charge transfer unit and the charge reset unit are formed in a silicon substrate.

(6) The solid state imaging device according to any one of (1) to (5), further including,
a discharging unit that is connected to the photoelectric conversion unit and discharges charges accumulated in the photoelectric conversion unit.

(7) A driving method of a solid state imaging device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level and then the photoelectric conversion unit is subject to light exposure, the driving method including:
performing, by the driving unit, driving such that a potential of a drain of the charge reset unit is controlled so that the charges are accumulated in the photoelectric conversion unit and the charge-voltage conversion unit up to a saturation level, and then the photoelectric conversion unit is subject to light exposure.

(8) An electronic device including:
a photoelectric conversion unit that performs photoelectric conversion of converting incident light into charges and accumulates the charges;
a charge-voltage conversion unit that converts the charges which have been subjected to the photoelectric conversion by the photoelectric conversion unit into a voltage;
a charge transfer unit that transfers charges to the charge-voltage conversion unit;
a charge reset unit that resets charges of the charge-voltage conversion unit; and
a driving unit that performs driving such that a potential of a drain of the charge reset unit is controlled so that the charges are accumulated in the photoelectric conversion unit and the charge-voltage conversion unit up to a saturation level, and then the photoelectric conversion unit is subject to light exposure.

The present disclosure contains subject matter related to that disclosed in Japanese Priority Patent Application JP 2012-205619 filed in the Japan Patent Office on Sep. 19, 2012, the entire content of which is hereby incorporated by reference.

What is claimed is:
1. A solid state imaging device, comprising:
a photoelectric conversion unit that performs photoelectric conversion of converting incident light into charges and accumulates the charges;
a charge-voltage conversion unit that converts the charges which have been subjected to the photoelectric conversion by the photoelectric conversion unit into a voltage;
a charge transfer unit that transfers charges to the charge-voltage conversion unit;

a charge reset unit that resets charges of the charge-voltage conversion unit; and a driving unit that performs driving, such that a potential of a drain of the charge reset unit is controlled so that charges are accumulated in the photoelectric conversion unit and the charge-voltage conversion unit up to a saturation level, and then the photoelectric conversion unit is subject to light exposure.

2. The solid state imaging device according to claim 1, wherein the driving unit performs driving, such that a potential of a drain of the charge reset unit is controlled so that the charges are accumulated in the photoelectric conversion unit and the charge-voltage conversion unit up to a saturation level, an intermediate potential is applied to the charge reset unit to accumulate predetermined charges in the charge-voltage conversion unit, the charge reset unit enters a non-conduction state, the charges accumulated in the photoelectric conversion unit are transferred to the charge-voltage conversion unit, and then the photoelectric conversion unit is subjected to light exposure.

3. The solid state imaging device according to claim 1, wherein each of the charge transfer unit and the charge reset unit forms an overflow path.

4. The solid state imaging device according to claim 3, wherein the overflow path is formed by the charge transfer unit and the charge reset unit being depression type transistors.

5. The solid state imaging device according to claim 3, wherein both or either of the overflow paths formed by the charge transfer unit and the charge reset unit are formed in a silicon substrate.

6. The solid state imaging device according to claim 1, further comprising, a discharging unit that is connected to the photoelectric conversion unit and discharges charges accumulated in the photoelectric conversion unit.

7. A driving method of a solid state imaging device including a photoelectric conversion unit that performs photoelectric conversion of converting incident light into charges and accumulates the charges, a charge-voltage conversion unit that converts the charges which have been subjected to the photoelectric conversion by the photoelectric conversion unit into a voltage, a charge transfer unit that transfers charges to the charge-voltage conversion unit, a charge reset unit that resets charges of the charge-voltage conversion unit, and a driving unit that performs driving such that a potential of a drain of the charge reset unit is controlled so that the charges are accumulated in the photoelectric conversion unit and the charge-voltage conversion unit up to a saturation level and then the photoelectric conversion unit is subject to light exposure, the driving method comprising:

performing, by the driving unit, driving such that a potential of a drain of the charge reset unit is controlled so that the charges are accumulated in the photoelectric conversion unit and the charge-voltage conversion unit up to a saturation level, and then the photoelectric conversion unit is subject to light exposure.

8. An electronic device comprising:

a photoelectric conversion unit that performs photoelectric conversion of converting incident light into charges and accumulates the charges;

a charge-voltage conversion unit that converts the charges which have been subjected to the photoelectric conversion by the photoelectric conversion unit into a voltage;

a charge transfer unit that transfers charges to the charge-voltage conversion unit;

a charge reset unit that resets charges of the charge-voltage conversion unit; and a driving unit that performs driving such that a potential of a drain of the charge reset unit is controlled so that the charges are accumulated in the photoelectric conversion unit and the charge-voltage conversion unit up to a saturation level, and then the photoelectric conversion unit is subject to light exposure.

* * * * *